Figure 1:
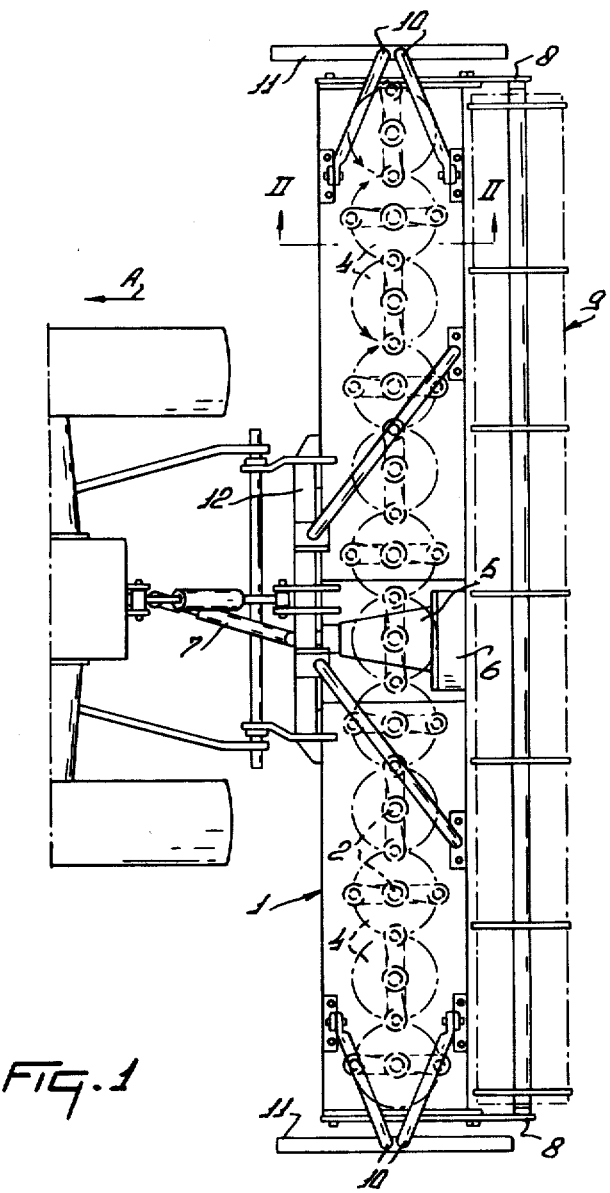

United States Patent [19]

van der Lely

[11] 4,053,020

[45] Oct. 11, 1977

[54] SOIL WORKING TINES

[76] Inventor: Cornelis van der Lely, 7, Bruschenrain, Zug, Switzerland

[21] Appl. No.: 547,726

[22] Filed: Feb. 6, 1975

[30] Foreign Application Priority Data

Feb. 8, 1974 Netherlands .................. 7401725

[51] Int. Cl.² ........................................... A01B 23/02
[52] U.S. Cl. .................... 172/713; 172/526; 172/766; 172/59; 172/762
[58] Field of Search ............ 172/713, 769, 770, 771, 172/766, 773, 522, 523, 524, 525, 526, 59, 765, 110, 111; D8/13; D39/1

[56] References Cited

U.S. PATENT DOCUMENTS

| 237,789 | 2/1881 | Walker | 172/713 X |
|---|---|---|---|
| 267,061 | 11/1882 | Chamberlain | 172/773 |
| 712,221 | 10/1902 | Wallis | 172/713 X |
| 770,870 | 9/1904 | Sleeper | 172/771 X |
| 1,033,574 | 7/1912 | Freeman | 172/713 |
| 1,718,248 | 6/1929 | Mohr | 172/713 X |
| 2,847,921 | 8/1958 | Heckathorn | 172/713 X |
| 3,705,630 | 12/1972 | Vissers | 172/713 |
| 3,809,166 | 5/1974 | van der Lely et al. | 172/59 |
| 3,841,411 | 10/1974 | van der Lely et al. | 172/523 X |

FOREIGN PATENT DOCUMENTS 1,090,009 11/1967 United Kingdom ............... 172/713

Primary Examiner—George J. Marlo
Attorney, Agent, or Firm—Mason, Mason & Albright

[57] ABSTRACT

A tine on a rotary harrow has an upper fastening portion and a lower soil working portion which portions meet at a junction. The fastening portion is tapered to be tightly held in a holder without turning and has an upper threaded end that receives a nut and a lower, multi-sided region that merges into a similar region at the top of the soil working portion. The junction has an enlarged cross-section that preferably is hexagonal and towards the lower tip of the soil working portion, the cross-section changes into a generally rectangular cross-section region. When placed in a holder, the junction is located at the lower end of the holder and the longitudinal axes of the two portions are angled to one another. Also, a rib is located at the leading side of the soil working portion and grooves are formed in the leading flat sides thereof. Grooves of lesser magnitude are formed in the trailing sides of the soil working portion relative to the direction of intended rotation.

13 Claims, 14 Drawing Figures

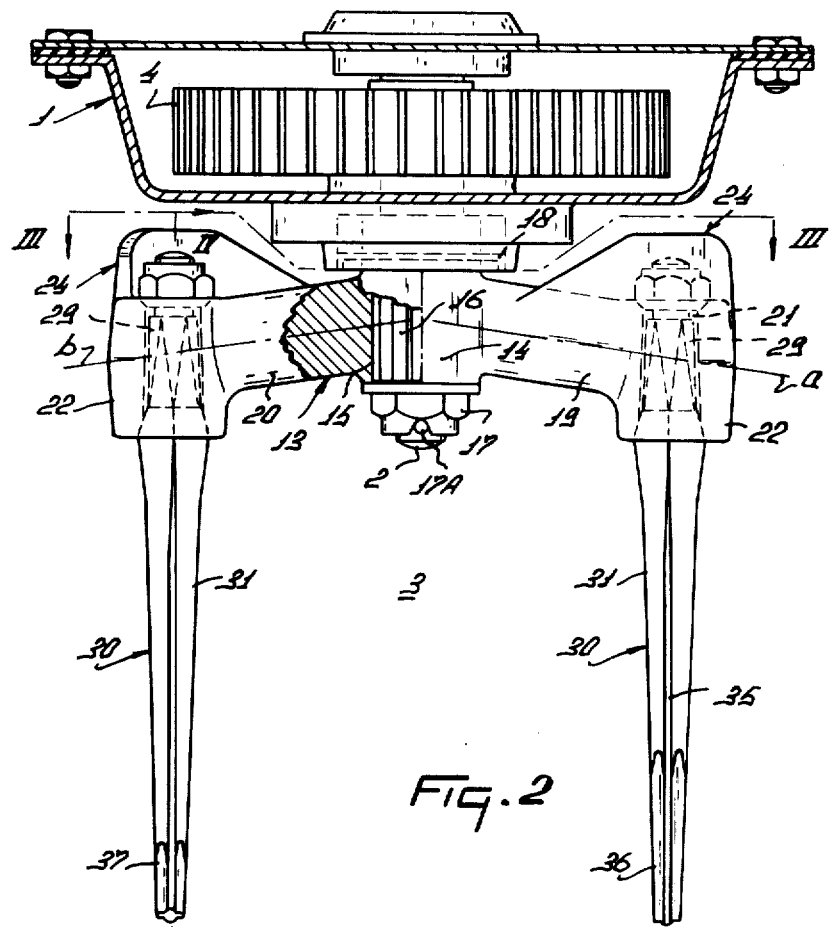
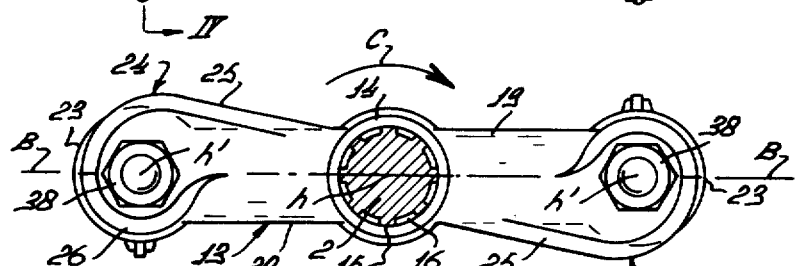

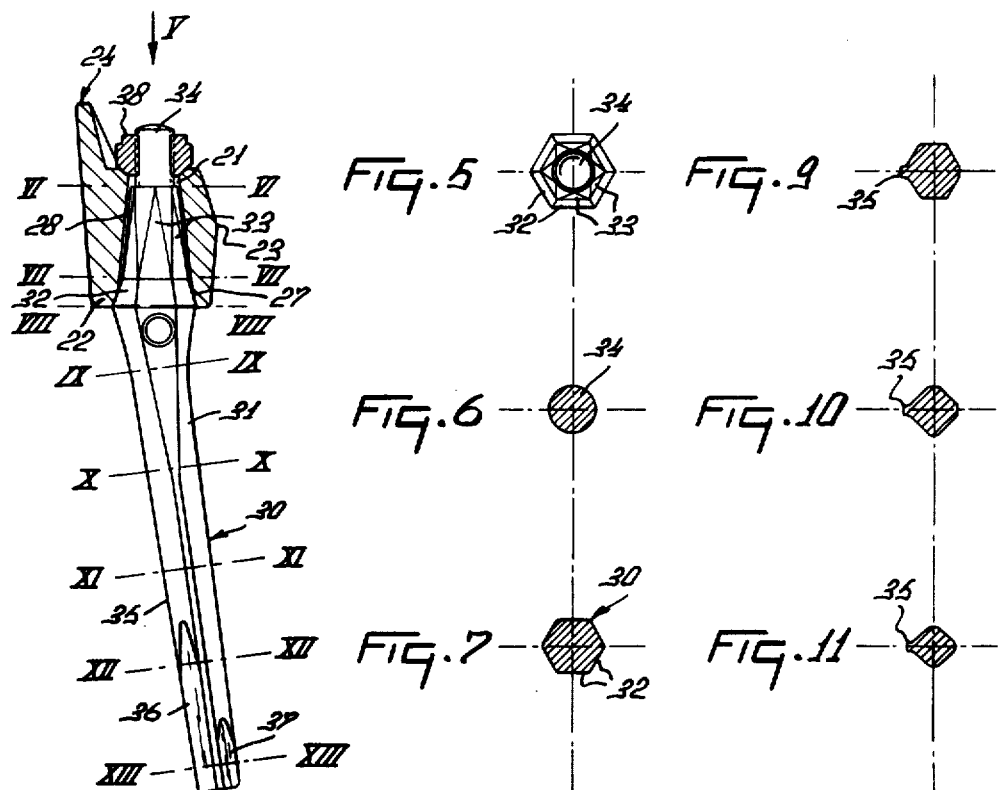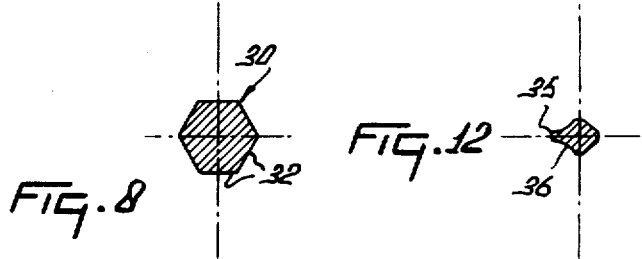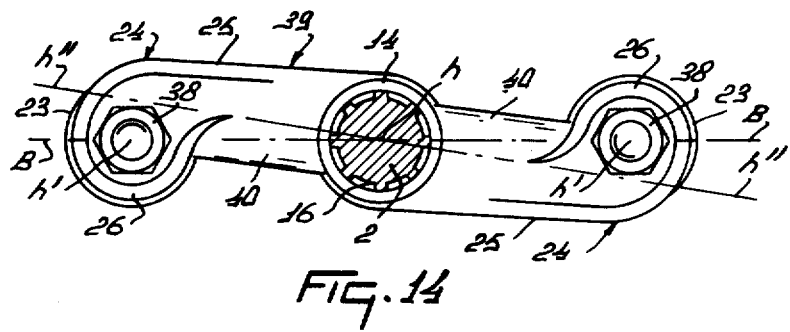

SOIL WORKING TINES

For a better understanding of the invention, and to show how the same may be carried into effect, reference will now be made, by way of example, to the accompanying drawings, in which:

FIG. 1 is a plan view of a rotary harrow whose soil working members have tines in accordance with the invention, the harrow being connected to the rear of an agricultural tractor, FIG. 2 is a section, to an enlarged scale, taken on the line II—II in FIG. 1, FIG. 3 is a section taken on the line III—III in FIG. 2, FIG. 4 is a section taken on the line IV—IV in FIG. 2, FIG. 5 is a plan view of the tine of FIG. 4 as seen in the direction indicated by an arrow V in FIG. 4, FIGS. 6 to 13 are sections of the tine of FIG. 4 taken on the lines VI—VI to XIII—XIII respectively, and FIG. 14 is a second section taken on the line III—III in FIG. 2 but illustrates an alternative form of mounting for a tine in accordance with the invention.

Referring to the drawings, and particularly to FIG. 1 thereof, the invention is illustrated in its application to a rotary harrow which could also be considered as being a soil cultivating implement or cultivator. The rotary harrow has a hollow box-shaped frame portion 1 (FIGS. 1 and 2) that extends substantially horizontally transverse, and normally substantially horizontally perpendicular, to the intended direction of operative travel of the harrow which is indicated in FIG. 1 by an arrow A. A plurality (in this case, twelve) of the vertical or substantially vertical shafts 2 are rotatably mounted in upper and lower bearings of the frame portion 1 and lie in a single row in regularly spaced apart relationship. The distance between the longitudinal axes of immediately neighbouring shafts 2 will not be greater than 30 centimeters and is preferably, but not essentially, substantially 25 centimeters. The lowermost end of each shaft 2 that projects beneath the bottom of the hollow frame portion 1 carries a corresponding tined soil working member that is generally indicated by the reference 3. Each shaft 2 is provided, inside the hollow frame portion 1, with a corresponding straight- or spur-toothed pinion 4, the twelve pinions 4 being of such a size, and being arranged in such a way, that the teeth of each pinion 4 are in mesh with those of the immediately neighbouring pinion 4, or each of the immediately neighbouring pinions 4, in the single row thereof. One of the shafts 2 that corresponds to the central pair of soil working members 3 in the row thereof has an upward extension into a gear box 5 and bevel pinions and shafts within that gear box 5 place said shaft extension in driven connection with a rotary input shaft of the gear box 5 through the intermediary of a change-speed gear 6 mounted at the back of the gear box. The change-speed gear 6 comprises a plurality of interchangeable and/or exchangeable pinions of which a pair can be selected to enable a corresponding transmission ration between the shafts in the gear box 5 to be employed thus enabling the shafts 2 to be rotated at different speeds in response to an unchanged speed of rotation applied to the rotary input shaft of the gear box 5. The rotary input shaft that has just been mentioned has a splined or otherwise keyed end that projects forwardly from said gear box in substantially the direction A and that end is arranged to be placed in driven connection with the power take-off shaft of an operating tractor or other vehicle by way of an intermediate telescopic transmission shaft 7, which is of a construction that is known per se, having universal joints at its opposite ends.

Two arms 8 are turnable upwardly and downwardly alongside the opposite lateral sides or ends of the hollow frame portion 1 about substantially horizontally aligned pivots located in an upper and leading, with respect to the direction A, region of the frame portion 1. Means that are not shown in detail in the accompanying drawings are provided to enable the arms 8 to be secured in chosen angular settings about the aligned axis of the pivots which have just been mentioned and rearmost end regions of the arms 8 that are inclined downwardly towards the ground behind the frame portion 1 carry the opposite ends of a rotatable supporting member in the form of a ground roller 9. The ground roller 9 extends throughout substantially the whole of the working width of the harrow and is of an open, rather than closed, substantially right circular cylindrical formation. The angular settings of the arms 8 about their pivotal connections to the hollow frame portion 1 that are chosen determine the level of the axis of rotation of the ground roller 9 relative to the remainder of the harrow and this, it will be realised, is a principal factor in determining the working level of the harrow and thus the depths by which the tines of its soil working members 3 can penetrate into the ground.

Arms 10 are turnable about substantially horizontally aligned pivots mounted on top of the frame portion 1 so as to define axes that are substantially parallel to the direction A. The arms 10 extend from their pivot mountings over the opposite lateral sides or ends of the frame portion 1 and there carry upright shield plates 11 whose lowermost edges bear against the ground surface during the operation of the harrow and can slide over that surface in the direction A. The shield plates 11 extend substantially parallel to the direction A and can turn upwardly and downwardly about the pivotal mountings of the arms 10 to match undulations in the surface of the ground that may be met with during passage over the soil. The shield plates 11 co-operate with the soil working members 3 at the opposite ends of the row of those members and minimise ridging of the soil at the opposite edges of the strip of ground that is worked by the members 3 during the operation of the harrow. The shield plates 11 also prevent stones and other potentially dangerous objects from being flung sideways from the harrow by the rapidly moving tines of its soil working members 3 and thus greatly reduce the likelihood of injury to persons in the vicinity and the likelihood of damage to property. The front of the frame portion 1 with respect to the direction A is provided with a coupling member or trestle 12 of generally triangular configuration which coupling member or trestle can be employed in the manner that can be seen in outline in FIG. 1 of the drawings in connecting the harrow to the three-point lifting device or hitch at the rear of an agricultural tractor or other operating vehicle.

FIG. 2 to 13 of the drawings illustrate one embodiment of soil working tines and their mountings. In this embodiment, each soil working member 3 comprises a tine mounting, generally indicated by the reference 13, carried by the lowermost end of a corresponding one of the shafts 2 that projects beneath the frame portion 1. The parts of the tine mounting 13 are made integrally from a single piece of metallic material by forging or casting, said mounting 13 comprising a central boss 14 of substantially right circular cylindrical configuration, said boss 14 being formed with an internal axially extending bore 15. The internal wall of the bore 15 carries a plurality of splines 16 that extend throughout the length of that bore, the splines 16 being arranged to co-operate with external splines at the lowermost end of the corresponding shaft 2 to ensure that the soil working member 3 will be rigid in rotation with its shaft 2 at all times. A short screwthreaded portion is provided beneath the splined portion of each shaft 2 and a nut 17 and washer co-operate with each such screwthreaded portion to maintain the corresponding boss 14 axially in position on the shaft 2. A split pin or the like 17A is used to prevent the loosening of each nut 17. A sealing ring 18 is located on top of the boss 14 and, when the tine mounting 13 is in its appointed position, the sealing ring 18 is clamped tightly between the boss 14 and the bottom of the lower bearing for the corresponding shaft 2, the ring 18 acting to prevent significant oil leakage from that bearing. The tine mounting 13 comprises support portions 19 and 20 whose longitudinal axes $a$ and $b$ (FIG. 2) are diametrically opposed when the assembly is viewed lengthwise (FIG. 3) of the longitudinal axis $h$ (axis of rotation) of the corresponding shaft 2. The axis $h$ is also the longitudinal axis of the internal bore 15 of the boss 14. As will be evident from FIG. 2 of the drawings, the support portions 19 and 20 are, actually, both downwardly inclined away from the ends thereof that are integral with the boss 14. An acute angle is thus enclosed between the axis $h$ and each of the axes $a$ and $b$. It will be remembered that the axis $h$ is vertically or substantially vertically disposed.

Each of the support portions 19 and 20 is provided, near the end thereof which is remote from the boss 14, with a corresponding tine holder 22 of generally cylindrical configuration, formed with a central bore 21 whose longitudinal axis $h'$ is parallel or substantially parallel to the axis $h$ of the internal bore 15 of the boss 14. The central bores 21 of the two tine holders 22 are each constructed and arranged to receive the fastening portion of a corresponding rigid soil working tine 30. Each of the tines 30 has a lower active or soil working portion 31 and it will be noted that the axial length of each tine holder 22 is equivalent to substantially one-third of the length of one of the active or soil working portions 31. It will also be noted from FIG. 3 of the drawings that the longitiudinal axis $h$ and the two longitudinal axes $h'$ contained in a common substantially vertical plane B—B. The front of each of the support portions 19 and 20 with respect to the intended direction of rotation C (FIG. 3) of the corresponding soil working member 3 is provided with an integral screen 24 and, as viewed in FIG. 3 of the drawings, the front of each such screen 24 and the corresponding support portion 19 or 20 with respect to the direction C is inclined to the plane B—B. However, the rear of each of the support portions 19 and 20 with respect to the same direction C as seen in FIG. 3 of the drawings is substantially parallel to the plane B—B.

It will be seen from FIGS. 3 and 4 of the drawings that each of the tine holders 22 includes a thickened portion 23 whose maximum extent is at a level substantially midway between the top and the bottom of the holder 22 concerned. The thickened portions 23 extend partly around the tine holder 22 from their integral rear junctions (with respect to the direction C) with the corresponding support portions 19 and 20 towards the fronts of the holders 22 but are omitted in front regions of those holders (see FIG. 4). It can also be seen in FIGS. 2 to 4 of the drawings that the previously mentioned integral screens 24 are located principally, although not completely, at the front of the holders 22 with respect to the direction C and mainly above and in front of the mouths at the upper ends of the central bores 21 of the tine holders 22. Although each screen 24 tapers upwardly to some extent, at least its front with respect to the direction C is straight and substantially in line with the front of the corresponding holder with respect to the same direction as seen in cross-section (see FIG. 4). This straight front that can be seen in FIG. 4 is inclined at a few degrees to the corresponding axis $h'$ in such a way that the uppermost end thereof is further advanced with respect to the direction C (FIG. 3) than is the lowermost end thereof. Each screen 24 has its maximum height in front of the upper mouth of the corresponding central bore 21, the region of maximum height having a substantially flat upper edge which is substantially perpendicular to the corresponding axis $h'$ (see FIG. 2) but each such region is flanked laterally by regions of decreasing height. At that side of the region of maximum height of each screen 24 which is closest to the boss 14, said screen affords a downwardly inclined rim 25 (FIG. 3), said rims 25 merging integrally into the fronts of the corresponding support portions 19 and 20 (with respect to the direction C) close to the boss 14. The opposite ends of the screens 24 are afforded by rims 26 which extend steeply downwardly to merge into the top surfaces of the corresponding holders 22. Due to the slight forward inclination (FIG. 4) of each upwardly directed integral screen 24, significantly more of the metallic material of the whole tine mounting 13 is located in front, with respect to the direction C, of the plane B—B at each side of the axis h than is disposed behind that plane. This relationship is particularly true in the regions of the two tine holders 22 so that the rigidity of the material is high in these regions with an advantageous effect upon the resistance to damage by stones and the like that may be met with during working of the soil by the tines 30. Each tine mounting 13 is forged or cast from a single piece of metallic material in such a way that the forging or casting operation produces the screens 24 and also the bores 15 and 21. This method of manufacture makes it unnecessary to provide separate machining steps for the formation of the bores 15 and 21.

Each of the central bores 21 comprises a lower tapering part 27 and an upper tapering part 28 which adjoin one another but which are of different shapes and different lengths. The lower tapering part 27 is the shorter part and is the more steeply tapering and, due to its dispositon at the lower end of the corresponding tine holder 22, is the part which is nearest to the active or soil working portion 31 of the corresponding tine 30 when that tine is installed in its intended operative position. The lower tapering part 27 has an axial length which is substantially half that of the upper tapering part 28 and it will be seen from FIGS. 2 and 4 of the drawings that the axial length of the upper tapering part 28 is substantially half that of the bore 21 in the holder 22 with which it co-operates. The extreme upper end of the upper tapering part 28 terminates in an upwardly divergent mouth whose downwardly tapering frusto conical wall has a cone angle of substantially 90°, the apex of the imaginary cone being located on the axis $h'$ inside the central bore 21. The walls of the lower and upper tapering parts 27 and 28 are not of circular cross-section but are afforded by a plurality of flats. As will be seen in FIG. 7, in particular, of the drawings, there are six of the flats in the embodiment which is being described by way of example so that the cross-section is of regular hexagonal configuration. However, in the upper tapering part 28, there are two regular hexagonal cross-sections which are angularly offset from one another by 30° about the axis h' and the effect is to produce twelve triangular flats six of which have their bases at the top of the part 28 and their apices at the junction of that part with the part 27 while the other six have their bases at the level of the junction between the parts 27 and 28 and their apices at the top of the part 28. The twelve triangles of these two different kinds are in alternate succession around the axis h'.

The central bores 21 of the tine holders 22 that are shaped in the manner described above receive fastening portions 29 of the corresponding tines 30. The fastening portion 29 of each tine 30 makes an integral junction with the active or soil working portion 31 thereof, both portions being substantially straight and their longitudinal axes being inclined to each other by an angle which is advantageously substantially 8° and which it is preferred should not be less than substantially 8°. A junction portion 32 which lies immediately above the integral connection between the fastening portion 29 and the active or soil working portion 31 is of regular hexagonal cross-section (see FIG. 8), said junction portion 32 being upwardly tapering to fit the lower tapering part 27 of the central bore 21. Each flat of the lower tapering part 27 is inclined to the axis h' at an angle of substantially 150° and has an axial length which it is preferred should be substantially 15 millimeters. The junction portion 32 which fits in the lower tapering part 27 of the bore 21 is adjoined by an upper conical portion 33 whose shape exactly matches that of the upper tapering part 28 in which it is to fit and thus exhibits twelve relatively inclined triangular flats. The shapes of the portions 32 and 33 can be seen most clearly in FIG. 5 of the drawings. The upper conical portion 33 terminates in a screwthreaded end portion 34 (FIG. 6) that is of circular cross-section. The active or soil working portion 31 tapers downwardly away from the junction portion 32 and, while it is of regular hexagonal cross-section close to the junction portion 32, it progressively changes in cross-section as the distance from the junction portion 32 increases to assume a substantially rectangular cross-section at and beneath the level of FIG. 10 of the drawings. The active or soil working portion 31 is progressively flattened towards its lowermost free end or tip in such a way that the ratio between the lengths of perpendicular diameters between opposite corners of said portion, as seen in cross-section, is substantially 1:2 at and near said free end or tip(see FIG. 13 of the drawings).

FIGS. 8 to 13 of the drawings show that the change from a regular hexagonal cross-section near the junction portion 32 to a substantially rectangular cross-section at and below the level of FIG. 10 is completed at a location substantially one-third of the way towards the lowermost free end or tip of the portion 31 from the level of FIG. 8 of the drawings. It can be seen from FIG. 9 that a rib 35 is formed at the leading corner (in cross-section) of the active or soil working portion 31 with respect to the direction C by flattening that corner and said rib 35 extends downwardly to the lowermost free end or tip (see also FIGS. 10 to 13). Leading hollow recesses or grooves 36 are formed in the what would otherwise be flat forwardly directed surfaces of the lower substantially rectangular cross-section region of the active or soil working portion 31 and, similarly, trailing hollow recesses or grooves 37 are formed in the corresponding pair of rearwardly directed surfaces thereof. It can be seen from FIGS. 4, 12 and 13 of the drawings that the upper ends of the recesses or grooves 36 and 37 become progressively shallower and vanish into the surfaces in which they are formed by way of points and it will be noted from the same Figures of the drawings that the leading recesses or grooves 36 extend upwardly from the lowermost free end or tip of the portion 31 throughout substantially onethird of the length of that portion while the trailing recesses or grooves 37 extend upwardly from said lowermost free end or tip throughout not more than substantially one-sixth of the length of said portion 31. FIGS. 9 to 13 of the drawings also show that, as seen in cross-section, the corner of the portion 31 which is opposite to the rib 35 is also flattened whereas, at and below the upper ends of the trailing hollow recesses or grooves 37, the other two corners (as seen in cross-section) are rounded off (see particularly FIG. 13 of the drawings). The leading hollow recesses or grooves 36 differ in depth to those of the trailing hollow recesses or grooves 37 to produce the cross-sectional shape at and near the free end or tip of the portion 31 which can be seen best in FIG. 13 of the drawings, this shape being one which is advantageous in breaking up naturally hard or artifically compacted subsoil.

The fastening portion 29 is firmly but releasably retained in the central bore 21 of the corresponding tine holder 22 by applying a fastening nut 38 to the screwthreaded portion 34 at the uppermost end of said portion 29. The lower end of the nut 38 has a downwardly tapering frusto conical surface which is arranged to co-operate centringly with the matchingly shaped mouth at the upper end of the bore 21. The junction portion 32 is tightly clamped in the lower tapering part 27 of the bore 21 and the flats formed on the portions 32 and 33 co-operate with those in the tapering lower and upper parts 27 and 28 of the bore 21 in preventing the tine 30 from turning about the axis h' of the central bore 21 when that tine is fixed in its appointed operative position.

The construction of the tine mounting 13 that has been described enables that mounting to be formed in a simple manner by forging, or by casting, the method of manufacture being one which does not require separate machining operations for the formation of the bores 15 and 21. The splines 16 in the internal bore 15 of the boss 14 enable the mountings 13 to be attached quickly to, or removed from, the lowermost ends of the shafts 2 so that it is quite a quick and simple operation to substitute tine mountings of other shapes or tine mountings carrying alternative tines. The downward inclination of the support portions 19 and 20 from the boss 14 to the tine holders 22 ensures that, as can be seen in FIG. 2 of the drawings, a significant space is left between the bottom of the frame portion 1 and the top of the tine mounting 13 and this is conducive to pushing away any stones or the like that might otherwise tend to get trapped in this region during the operation of the harrow. As previously mentioned, the provision of the integral screens 24 has the result that more of the metallic material of each tine mounting 13 is located in front of the plane B—B (FIG. 3) with respect to the direction C at each side of the axis h (FIGS. 2 and 3) than there is behind that plane and this form of tine mounting is particularly suitable for the cultivation of stony soil. The formation of the mounting 13 by forging or by casting, has the additional advantage that the most suitable metallic material for that purpose can be employed bearing in mind that no welds or like metallic joints need be formed between different parts of the mounting, 13.

The tines 30 are also formed from metallic material by forging, or by casting, and the basically hexagonal crosssection thereof that extends from the level of FIG. 7 to the level of FIG. 10 of the drawings gives that region of the tine very high resistance to bending and breakage. The shape of the whole of the active or soil working portion 31, including the upper end thereof that is basically hexagonal cross-section is a shape which produces most effective displacement of the soil for harrowing and other cultivation purposes. The upper conical portion 33 of the fastening portion 31 of the tine 30 gives a gradual transition from the junction portion 32 that is of regular hexagonal crosssection to the upper screwthreaded portion 34 that is of circular cross-section. The strength, or at least the rigidity, of the active or soil working portion 31 of the tine 30 gradually decreases towards its lowermost free end or tip from the level of FIG. 8 of the drawings at which level said portion 31 integrally joins the junction portion 32.

FIG. 14 of the drawings illustrates a tine mounting 39 which is similar in many respects to the tine mounting 13 that has been described above. However, in the embodiment of FIG. 14, the support portions 40 that are again located at diametrically opposite sides of the boss 14 are differently shaped and disposed to the corresponding support portions 19 and 20 in the preceding embodiment. As seen in FIG. 14 which corresponds to FIG. 3, the longitudinal axes h'' of the support portion 40 are inclined to the plane B—B. The front of each of the support portions 40 with respect to the intended direction of rotation C (FIG. 3) is contained in a flat plane, as seen in FIG. 14, which is substantially tangential to the outer surface of the central boss 14, said plane also being inclined to the plane B—B. In this embodiment, the longitudinal axes h'' of the two support portions 40 are located at opposite sides of the plane B—B and, with respect to the direction C (FIG. 3), the central bores 21 of the tine holder 22 are disposed rearwardly of said axes h''. As seen in FIG. 14 of the drawings, the rear of each support portion 40 with respect to the direction C is also inclined to the plane B—B. Once again, the whole tine mounting 39 is made from a single piece of metallic material by forging or casting, the screens 24 being integral with the remainder of the mounting so that no separate machining operations are required for the formation of the bores 15 and 21. Once again, the provision of the integral screens 24 ensures that there is more of the metallic material of each support portion 40 of the mounting 39 in front of the plane B—B, with respect to the direction C, at each side of the axis h, than there is behind that plane with respect to the same direction. A very high resistance to damage by stones and other sharp objects that may be met with during operation of a harrow incorporating the mounting 39 of FIG. 14 is thus obtained.

Although various features of the tine that has been described and/or that is illustrated in the accompanying drawings will be set forth in the following claims as inventive features, it is emphasised that the invention is not necessarily limited to those features and that it includes within its scope each of the parts of the tine that has been described and/or that is illustrated in the accompanying drawings both individually and in various combinations.

What we claim is:

1. An elongated tine for a rotary harrow comprising a substantially straight upper fastening portion and a substantially straight lower soil working portion that terminates in a lower tip, said fastening portion having a lower first tapering part and an adjoining upper second tapering part, each of said parts tapering inwardly and upwardly towards a screw threaded portion located at an upper free end of the fastening portion, said first part adjoining an integral junction with said soil working portion and said second part being located between said first part and said screw threaded portion, said first part more steeply tapering inwardly than said second part and each said part having substantially conical configuration, said second part extending for substantially at least half of the length of said fastening portion.

2. A tine as claimed in claim 1, wherein the cone angle of said first tapering part is about 30°.

3. A tine as claimed in claim 1, wherein both of said tapering parts are polygonal in cross-section and multisided.

4. A tine as claimed in claim 1, wherein the greatest cross-sectional area of said tine is at said junction between the fastening and soil working portions and said cross-sectional area being hexagonal in shape.

5. A tine as claimed in claim 4, wherein the hexagon defined by said cross-sectional area is a regular hexagon.

6. A tine as claimed in claim 4, wherein said hexagonal cross-section of the tine continues upwardly from said junction into a region of said fastening portion.

7. A tine as claimed in claim 1, wherein said soil working portion, from said junction, progressively changes into a lower region of said soil working portion that is substantially rectangular in cross-section adjacent said lowermost tip.

8. A tine as claimed in claim 4, wherein the transition from said hexagonal cross-section to said rectangular cross-section of said soil working portion is substantially complete at a location substantially one-third of the distance along the length of said soil working portion from said junction.

9. A tine as claimed in claim 7, wherein, as seen in cross-section, at least one corner of said soil working portion is flattened along its length, said flattened corner forming a rib which extends for substantially the entire length of said soil working portion, said rib being located at the leading side of the tine with respect to the intended direction of operative rotation thereof.

10. A tine as claimed in claim 7, wherein grooves are formed in all four sides of the lower region of the soil working portion that has a rectangular cross section, said grooves extending upwardly from said tip, and two grooves at the front of said tine, with respect to the intended direction of operative rotation thereof, being of greater length than those two grooves at the rear of said tines with respect to said direction, the depth of the front grooves being different than the depth of the rear grooves.

11. A tine as claimed in claim 1, wherein the opposite ends of said second part have cross-sections which are angularly offset relative to one another by about 30° around a longitudinal center line of said fastening portion.

12. A tine as claimed in claim 1, wherein said screw-threaded portion is substantially circular in cross-section.

13. An elongated tine for a rotary harrow comprising a substantially straight upper fastening portion and a substantially straight lower soil working portion that terminates in a lower tip, the longitudinal axes of said fastening portion and working portion being inclined to one another, said fastening portion having a lower first tapering part and an adjoining upper second tapering part, each of said parts tapering inwardly and upwardly towards a screw threaded portion located at an upper free end of the fastening portion, said first part adjoining an integral junction with said soil working portion and said second part being located between said first part and said screw threaded portion, said first part more steeply tapering inwardly than said second part and each said part having a substantially conical configuration, said second part extending for substantially at least half of the length of said fastening portion.

* * * * *